(12) United States Patent
Wilkerson et al.

(10) Patent No.: US 7,238,025 B1
(45) Date of Patent: Jul. 3, 2007

(54) SYSTEM AND METHOD FOR DETERMINING EMPATHY

(76) Inventors: Lawrence Edwin Wilkerson, 463 Nova Albion Way, San Rafael, CA (US) 94903; Kathy Lynne Cituk, 15 Sandstone Ct., San Rafael, CA (US) 94903

( * ) Notice: Subject to any disclaimer, the term of this patent is extended or adjusted under 35 U.S.C. 154(b) by 0 days.

(21) Appl. No.: 10/678,335

(22) Filed: Oct. 3, 2003

(51) Int. Cl.
*G09B 19/00* (2006.01)
(52) U.S. Cl. .................. 434/236; 434/322; 434/323
(58) Field of Classification Search ............... 434/236, 434/322–323
See application file for complete search history.

(56) References Cited

U.S. PATENT DOCUMENTS 3,764,135 A * 10/1973 Madison .................. 273/459
4,627,818 A * 12/1986 Von Fellenberg ........... 434/236

* cited by examiner

*Primary Examiner*—Chanda L. Harris
(74) *Attorney, Agent, or Firm*—Risto A. Rinne, Jr.

(57) ABSTRACT

A system and method for determining a level of empathy between two people includes four sets of questions for each query posed, a first set being how a first participant feels about a topic, a second set being how the first participant thinks a second participant would answer the same question, a third set being how the second participant feels about the topic, and a fourth set being how the second participant thinks the first participant will answer the same question. A "weighted" numerical range of possible answer selections are provided for each question from each set. The first set is compared with the fourth set, the second set is compared with the third set to determine an empathy index for each query for each of the participants. The process is repeated for a plurality of questions that are averaged to also provide an overall empathy index and also various group indices.

22 Claims, 4 Drawing Sheets

| The Empathy Index | A<br>Your<br>Answer | B<br>How You Think<br>Your Partner<br>Answered |
|---|---|---|
| 1. How comfortable are you with your physical appearance?<br>(Very Uncomfortable) 1-2-3-4-(5)-6-7-8-9 (Very Comfortable) | ☐ | ☐ |
| 2. Do you (or would you) feel awkward or uncomfortable if (your partner) watches you bathe or get dressed?<br>(I do not like it) 1-2-3-4-(5)-6-7-8-9 (Absolutely okay) | ☐ | ☐ |
| 3. How physically fit do you consider yourself?<br>(Not fit at all) 1-2-3-4-(5)-6-7-8-9 (Very fit) | ☐ | ☐ |
| 4. How willing are you to change your behavior to improve your health?<br>(Not very) 1-2-3-4-(5)-6-7-8-9 (Very) | ☐ | ☐ |
| 5. How much effort do you expend to maintain your health?<br>(Very little) 1-2-3-4-(5)-6-7-8-9 (Alot) | ☐ | ☐ |
| 6. Generally, do you make an effort to eat nutritious foods?<br>(No) 1-2-3-4-(5)-6-7-8-9 (Yes) | ☐ | ☐ |
| 7. Is alcohol consumption by you a problem in your relationship?<br>(Not at all) 1-2-3-4-(5)-6-7-8-9 (Very much) | ☐ | ☐ |
| 8. If you are home in bed with the flu, how much help and attention do you want from (your partner)?<br>(None) 1-2-3-4-(5)-6-7-8-9 (Massive amounts) | ☐ | ☐ |

FIG.2

| The Empathy Index | C<br>Your Answer | D<br>How You Think Your Partner Answered |
|---|---|---|
| 1. How comfortable are you with your physical appearance?<br>(Very Uncomfortable) 1-2-3-4-(5)-6-7-8-9 (Very Comfortable) | ☐ | ☐ |
| 2. Do you (or would you) feel awkward or uncomfortable if (your partner) watches you bathe or get dressed?<br>(I do not like it) 1-2-3-4-(5)-6-7-8-9 (Absolutely okay) | ☐ | ☐ |
| 3. How physically fit do you consider yourself?<br>(Not fit at all) 1-2-3-4-(5)-6-7-8-9 (Very fit) | ☐ | ☐ |
| 4. How willing are you to change your behavior to improve your health?<br>(Not very) 1-2-3-4-(5)-6-7-8-9 (Very) | ☐ | ☐ |
| 5. How much effort do you expend to maintain your health?<br>(Very little) 1-2-3-4-(5)-6-7-8-9 (Alot) | ☐ | ☐ |
| 6. Generally, do you make an effort to eat nutritious foods?<br>(No) 1-2-3-4-(5)-6-7-8-9 (Yes) | ☐ | ☐ |
| 7. Is alcohol consumption by you a problem in your relationship?<br>(Not at all) 1-2-3-4-(5)-6-7-8-9 (Very much) | ☐ | ☐ |
| 8. If you are home in bed with the flu, how much help and attention do you want from (your partner)?<br>(None) 1-2-3-4-(5)-6-7-8-9 (Massive amounts) | ☐ | ☐ |

FIG.3

| | |
|---|---|
| *Score Sheet* | Step 1: Fill in the numbers from the appropriate boxes on the questionaires.<br>Step 2: The difference between the two numbers is your Empathy Index! |

1. How comfortable are you with your physical appearance?
   (Very Uncomfortable) 1-2-3-4-(5)-6-7-8-9 (Very Comfortable)

A __ D __ = E/I __
   B __ C __ = E/I __

2. Do you (or would you) feel awkward or uncomfortable if (your partner) watches you bathe or get dressed?
   (I do not like it) 1-2-3-4-(5)-6-7-8-9 (Absolutely okay)

A __ D __ = E/I __
   B __ C __ = E/I __

3. How physically fit do you consider yourself?
   (Not fit at all) 1-2-3-4-(5)-6-7-8-9 (Very fit)

A __ D __ = E/I __
   B __ C __ = E/I __

4. How willing are you to change your behavior to improve your health?
   (Not very) 1-2-3-4-(5)-6-7-8-9 (Very)

A __ D __ = E/I __
   B __ C __ = E/I __

5. How much effort do you expend to maintain your health?
   (Very little) 1-2-3-4-(5)-6-7-8-9 (Alot)

A __ D __ = E/I __
   B __ C __ = E/I __

6. Generally, do you make an effort to eat nutritious foods?
   (No) 1-2-3-4-(5)-6-7-8-9 (Yes)

A __ D __ = E/I __
   B __ C __ = E/I __

7. Is alcohol consumption by you a problem in your relationship?
   (Not at all) 1-2-3-4-(5)-6-7-8-9 (Very much)

A __ D __ = E/I __
   B __ C __ = E/I __

8. If you are home in bed with the flu, how much help and attention do you want from (your partner)?
   (None) 1-2-3-4-(5)-6-7-8-9 (Massive amounts)

SYSTEM AND METHOD FOR DETERMINING EMPATHY

BACKGROUND OF THE INVENTION

1. Field of the Invention

The present invention, in general relates to a system and method for determining empathy between two people and, more particularly, to an Internet-based system for determining a subjective index that is representative of the level of empathy that two people have for one-another.

For significant relationships that include boyfriend and girlfriend, husband and wife, or other life-partners and potential life-partners, it is desirable to promote peaceful, harmonious relationships.

Much study has gone into determining and measuring compatibility based on a comparison of values, goals, religious affiliation and the like. There are numerous compatibility tests that people can take which measure these areas.

Still, people who fare well on such "value-based" compatibility types of tests often suffer in their most intimate relationships. And oddly enough, sometimes people who have significant differences in these areas are able to find a way to relate in a healthy, peaceful, and harmonious way making space for these differences. Accordingly, the dynamics of relationship success have remained a mystery.

However, a key factor to predicting success in relating can simply be stated by saying that success is more about "how well people know each other" than about what they have in common. It is from that level of mutual understanding, or empathy for one another, that people modify their behavioral interactions. For example, if a man knows that his partner does not like to sleep in total darkness, then that man may be amenable to using a night-light. Conversely, a total lack of awareness of the needs of his partner might make him insensitive to allowing a night-light to remain on.

Accordingly, it is how well people know each other, perhaps more than anything else, that determines their ultimate compatibility. They can be adherents of the same religion, share numerous values and similar goals, enjoy participating in the same sports and hobbies, but because the fabric of relationship is infinitely more subtle than these course measurements can reveal, they can continue to injure one another until they discover they are not compatible and eventually decide to separate.

Empathy includes more than merely knowing another person. Empathy generally includes an ability to also identify with and understand the feelings, situation, and motives of another person, to paraphrase a definition from Webster's New College Dictionary. This ability to identify with another person arises from an especially deep understanding of the other person. For example, a first person can be intellectually aware of a particular phobia that another (i.e., a second) person has. This intellectual awareness is indicative of a certain level of empathy for the other person. When the first person's awareness also includes a deeper understanding of how and why the second person developed the phobia in the first place, then there is more likelihood for acceptance of the phobia instead of a judgment rising up against it. This deeper level of awareness, of knowing even more about the second person, is indicative of a greater degree of empathy for the other (second) person. If the first person can further relate the experiences of the second person to perhaps a similar frightening experience that they had, possibly in childhood, then there is an even greater possibility that the phobia of the second person will be gently accepted rather than harshly judged. This deeper level of awareness includes a level of self-awareness as well as that of knowing even more about the second person, and it too is indicative of even greater degrees of empathy for the other (second) person. A key to acceptance of one's partner is seen as twofold, a first and especially critical part being how deeply they know each other and the second being how well they know themselves so that they can relate the needs of their partner with those of themselves.

Assessing the level of empathy, including an awareness they have of each other's preferences and needs, is quite different than prior types of compatibility testing that essentially make a tally of these and other factors scoring high when there are many "like" factors and scoring low when there are substantial "differences".

Empathy instead speaks to the knowledge that each person has about the other person in these and other areas instead of the mere number of "hits and misses". There can be any number of differences in needs, preferences, values, etc., and because the two people really know each other (and themselves) well, empathy is high, and they are immanently compatible.

When the empathy level is high, a person knows the needs, preferences, even the issues and "buttons" that the other person has and can therefore choose to respond in ways that calm and soothe any given situation, rather than inflame it.

It matters little what the differences are as long as they are mutually known and accepted. Love is really about accepting the other person as they are and to do so one must be willing and able to learn about the other person, both in detail and in increasing depth as time passes, so as to understand the deep and rich nature that this other person possesses. In other words, you cannot accept what you are not even aware of. This overall awareness of the other person (and yourself) can be stated as your level of empathy for the other person. If people well understand each other and if, from this clear understanding they are able to accept each other, then the differences in values, habits, preferences, religion—almost anything that can be named—is diminished even to the point of utter insignificance.

Because all prior compatibility tests fail to effectively assess empathy, they therefore fail to optimally predict long-term relationship survivability (i.e., long-term compatibility).

When people share high levels of empathy they well understand each other's issues, needs, preferences, likes, and dislikes. From this understanding, each person has the awareness that is absolutely necessary if they are to modify their behavior so that they don't repeatedly injure the other person, for example, by saying something that brings up and aggravates an old wound (i.e., issue).

For example, if a woman was sensitive about her appearance and in particular about her lipstick because a previous life-partner had often bitterly complained about her appearance and in particular about her choice in the shade of lipstick she might (likely) have a strong reaction to criticism in this area.

If her current partner is unaware of this sensitivity (i.e., if he has a low level of empathy about issues appertaining to her appearance) then he might occasionally say critical things about her appearance and on occasion about the shade of lipstick she is wearing. Such comments are likely to cause substantial pain for the woman.

It is important to note that the pain experienced by the woman in this case would appear to be disproportionate to the severity of any remark that was made. Even a mildly disapproving comment about the shade of lipstick could trigger many unpleasant memories for the woman who would likely feel a disproportionate amount of hurt and upset as a result. It matters not that her partner meant to cause her no harm. The pain is felt because an unhealed wound from the past exists in her psyche. We each have our own unique mix of wounds and issues because we each have our own unique history which has helped to shape and mold our own unique personality. Whenever two people relate, they each bring their own unique mix or personalities into the relationship.

However, if he was instead well aware of this lipstick issue, he might then have abstained from making such types of comments. If he really understood her feelings in this area, he might even intervene on her behalf if he overheard another person saying something disparaging to her about her appearance. The woman would then likely feel that her partner cared for her, that he understood and loved her, that her needs were important to him. If she observed him intervening on her behalf, stronger feelings of love and approval for her partner are the likely result.

Accordingly, through such an awareness, through empathy, a partner is better able to relate in ways that promote feelings of love, peace, harmony, and safety. When it comes to relationship, ignorance is a cause of pain, not bliss.

Empathy implies a state of being that also includes more a dose of compassion, of caring. A healthy, empathic human being who becomes aware of what causes pain to another human being experiences an automatic innate avoidance to causing injury. Substantially healthy people normally and naturally do not want to injure each other. Quite the opposite, they spontaneously want to repeat the behaviors that they know will please those they care about.

There are disorders that some people experience where they don't particularly care if their actions cause injury to others. Such a lack of empathy is believed to arise primarily from traumas and abuses they experienced early in their lives and which have not been fully healed (as through appropriate therapy). Such "personality disorders" are not the norm and are generally rare. It is very unusual to encounter a person who is aware of the needs of another and willfully trespasses on those needs. These injured people, while they may be aware of some of the needs of others, do not value the needs of others and therefore have a low level of empathy, or regard for the feelings of others. Until they heal their own significant wounds enough to find satisfaction in being empathic of others, they will not be able to engage in relationship as a caring, nurturing life-partner.

As such, the level of empathy between two people becomes a barometer to predicting their chances of success in relationship, whether they are to become intimate life-partners or if the relationship is to develop into good and caring, nurturing and supportive friends.

Assessing empathy between two people can also be used as an effective remedial tool. It is possible and even likely that there is at least one particular area where even the most compatible of couples lack empathy for the feelings and needs of the other.

Heretofore, there has been no effective way of determining those areas of relationship where empathy levels are high, that is where the two people really know each other well and deeply, and of determining those areas of relationship where empathy levels are low, that is where either or both of the two people don't understand the needs, feelings, and idiosyncrasies of their partner especially well.

If such a measurement tool were possible, then couples could use the information in a most constructive way, that is to talk to each other more about those areas that they are weak in their mutual understanding of one-another.

For example, let us assume that a couple understands each other well regarding their views about exercise, diet, fitness, and health issues in general. It is not important that they share identical viewpoints about these or any other topic. One person can be well into exercise going to the gym several times a week whereas the other may put little thought or energy into exercise. Knowing each other's attitudes, needs, fears, desires is what is important. It is not necessary that they reach any compromise nor come to any agreement as to what is the "right" amount of exercise. It would be counterproductive for a couple, where one person goes to the gym six times per week and the other not at all, to agree to a compromise where they both go three times per week. That would fail to meet the needs of either person, yet this type of compromise is often touted as an approach to solving relationship differences. Rather, a much higher and better goal is to understand the other person's needs so well and so deeply that is becomes easier to accept them than to judge them as somehow being wrong.

If the exercise-resistant person understands the other person's need in this area and allows the pro-exercise partner to go to the gym as often as he or she likes, then there is not likely to be any problem in the relationship concerning attitudes toward health, exercise and fitness training. This level of understanding and awareness is much more likely to develop after the exercise-resistant person has learned considerably more about the pro-exercise person.

For example, the exercise-resistant person may discover that the pro-exercise person's mother, father, and siblings all led sedentary lives and that all of them succumbed to heart-disease at an early age. The exercise-resistant person may also learn that a cardiologist has deemed the pro-exercise person to be in an especially high-risk group for developing heart disease and, accordingly, has advised the pro-exercise person to exercise daily. As stated hereinabove, from this increased level of understanding, of empathy, the exercise-resistant person is then likely to easily, effortlessly let go of any harsh judgments regarding the amount of exercise the other person requires. In fact, the exercise-resistant person is likely to even support and encourage this exercise in proportion to the love that is felt for him or her. This is due both to the natural desire not to re-injure others, as was previously discussed, and also to simply wanting the other person to live a long and healthy life. We see by this example how increasing empathy can lead toward increasing levels of acceptance and even support when before there was primarily judgment against the other person.

Empathy does for relationship what no amount of compromise can. In compromise, people sometimes feel that they must lose part of themselves in order to satisfy the other. With empathy, people learn to better accept the other person as they are.

If, however, the exercise-resistant person remains unaware of the fundamental beliefs, fears, concerns, etc. that contribute to the other person's desire for exercise, then pressure may be put on the pro-exercise person to attend the gym less frequently. Conversely, if the pro-exercise person is unaware of the beliefs and attitudes that contribute to the other's avoidance of physical exercise, then the pro-exercise person may inadvertently apply pressure to the exercise-resistant person to make further efforts in this area, again to the possible overall detriment of the relationship.

If it can be determined that they both well understand the attitudes and resultant needs of the other, there does not have to be any problem amongst them. From a deep level of understanding, each can create the necessary space that makes it OK for the other person to just be who they are, and to even be loved for it. This is the heart of acceptance and it can only come from a high level of empathy.

If it can be determined that the two people do not understand the needs of each other, that their level of empathy is low in this particular area (i.e., exercise), then a topic for further discussion has been identified and this information is particularly useful in that it can bring to an end their ignorance and therefore also put an end to repeated injury arising from such ignorance.

It is also possible to determine significant problems, red-flags, as they are sometimes called. For example, in determining the attitudes each person has toward alcohol consumption, it can also be determined that a potential substance-abuse issue may exist. It is possible that one or both people can be aware of a high or frequent level of alcohol consumption, yet not be inclined to act on this issue because it is potentially risky and disturbing to the status quo of the relationship.

Accordingly, the instant system and method for determining empathy has the potential to detect potential problem areas in relationship regardless of either of the person's attitudes or even their level of empathy in this regard. For example, both people can be aware of excessive or frequent alcohol consumption by one of them. In this regard, though the empathy level would be high, neither person may see this behavior as a potential source of difficulty.

Accordingly, the system and method could be used to generate a suggestive referral that urges the affected person(s) to obtain professional help in this area. Clearly, this unexpected benefit could help to identify problem areas in a relationship before they become especially acute.

Not only is there a need for such a system, there is a need to allow others to participate at their own leisure and in an non-pressured way. Few people enjoy taking any type of a test. Most men are especially reluctant to participate in anything that has to do with "feelings", lest their own ineptitude in identifying and talking about their own or another person's feelings, surface.

Ideally, a system that measures empathy would not make any answer wrong. If this were clear from the onset, resistance to taking such a test would diminish.

Also, it is important to allow each person to take such an evaluation in private, as is strongly recommended, so as to lessen any possibility of interference or influence from their partner affecting their answers. While it is technically possible to take the test side by side with their partner, this is not preferred. It is, of course, possible for each person to take the test simultaneously from different locations. It is also possible for each person to take the test one after the other, however they may decide, as well as to go back and change answers until each person is satisfied. As mentioned above, it is desirable that each person be able to participate even if separated by great distance.

It is also important to preserve confidence regarding the answers and resultant "scores", otherwise fear that others aside from the test participants could possibly access and learn about the intimate details of one or both of the test participants, would arise. Furthermore, flexibility in presenting the scores can be useful in reflecting the empathy that a first person has for a second person, the empathy the second person has for the first, and a composite level of empathy, if desired. The empathy could be about a particular question, a related group of questions, an overall level of one person's empathy regarding the other or, as mentioned above, any composite type of a score. Such scores would therefore be useful in providing an index of one's empathy as a composite or a plurality of indices of empathy for each question or grouping, as desired.

Furthermore, the input data thus obtained can be retained in a data base. The raw input data can track gender, geography, ethnicity, or any other parameter that is desired. The accumulated data can be assembled and categorized as desired and then sold, absent the names of the participants of course, to researchers, therapists and others for a variety of constructive purposes. Perhaps many unsolved riddles about attraction and relationship can be solved as a result of the data thus accumulated.

Of course, participation in such a system could be made available on a fee basis. Preferably one member of a "couple" would pay the required fee and subscribe to the service, preferably using the Internet, and in so doing identify the other person (i.e., his or her partner) who would then later log on as well in order to participate. The initial subscriber would either be given (or select) a password that would be used in the log-in procedure. Accordingly, the system and method for determining empathy has the potential to generate significant revenue streams, worldwide. Participation could also be sold in group, such as to therapists, corporations, or to various organizations who could then make the system and method for determining empathy available to other couples/pairings of people.

The questions can and will, of course, be amended over time to better adapt to any particular situation, for example to a homosexual versus a heterosexual couple. As the system is used over time, refinements in the questions that are asked can enhance the accuracy of the results that are obtained. If desired, the questions can be tailored to more accurately assess the level of empathy between any two people once the nature of their relationship is ascertained. Are they in a new relationship in which they have recently begun dating one-another? Are they in a committed relationship? Are they married? Are they sexually intimate with each other? What is each person's gender? These and other factors can be used to better tailor the system and method for determining empathy to the needs of the participants, as desired. It can also be included as part of the input data that is retained in the data base and which can be of further help in various future research projects.

The benefits of having a high level of empathy can be expanded to include more than potential life-partners. What is the level of empathy between parent and child or between siblings? What is the level of empathy between co-workers who share office space? What is the level of empathy between a manager and his subordinates? Clearly, such a system can be expanded to determine the level of empathy between any two people, and hopefully used to improve that relationship.

A definition of compatibility has to do with having a capability of living or performing in a harmonious, agreeable, or friendly association with another person (paraphrasing Webster's New College Dictionary). Empathy provides the basis, the foundation, for that capability to arise.

Accordingly, there exists today a need for a system and method for determining empathy between two people.

Clearly, such a system and method would be useful and desirable.

2. Description of Prior Art

Compatibility tests are, in general, known. While the structural arrangements of the above described products and methods, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a system and method for determining empathy that includes a data base and related software program that is accessible over a local area network or over an Internet and which allows qualified participants to better assess the level of empathy they have for one another.

It is also an important object of the invention to provide a system and method for determining empathy that is useful in determining the level of empathy between two people.

Another object of the invention is to provide a system and method for determining empathy that, for a fee, allows participants to utilize the system which, based on the responses of the participants, provides an indication of a subjective level of empathy that the participants have for one another.

Still another object of the invention is to provide a system and method for determining empathy that allows a first participant to subscribe to the service and to answer a plurality of questions at their leisure and which allows a second participant to answer a similar plurality of questions at their leisure.

Still yet another object of the invention is to provide a system and method for determining empathy that allows a first participant to subscribe to the service and to answer a plurality of questions at a first location within a predetermined period of time and which allows a second participant to answer a similar plurality of questions at a second location within the predetermined period of time.

Yet another important object of the invention is to provide a system and method for determining empathy that allows a first participant to subscribe to the service and to answer a plurality of questions within a predetermined period of time and wherein the first participant is asked to provide two sets of answers to each of the plurality of questions, a first set of answers being how the first participant feels about topics addressed in the plurality of questions and a second set of answers being how the first participant thinks a second participant would answer the same questions.

Still yet another important object of the invention is to provide a system and method for determining empathy that allows a first participant to subscribe to the service and to answer a plurality of questions within a predetermined period of time and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions within the predetermined period of time and wherein the second participant is asked to provide an additional two sets of answers to each of the plurality of questions, a third set of answers being how the second participant feels about topics addressed in the similar plurality of questions and a fourth set of answers being how the second participant thinks the first participant would answer the similar plurality of questions.

A first further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the questions and wherein each of the fours sets of answers is given a number rating and wherein a comparison is made between the first set of answers and the fourth set of answers to determine an absolute value of the difference as being indicative of the level of empathy that the second participant has for the first participant.

A second further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the fours sets of answers is given a number rating and wherein a comparison is made between the second set of answers and the third set of answers to determine an absolute value of the difference as being indicative of the level of empathy that the first participant has for the second participant.

A third further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the fours sets of answers is given a number rating and wherein a comparison is made between the first set of answers and the fourth set of answers to determine an absolute value of the difference as being indicative of the level of empathy that the second participant has for the first participant and wherein a further comparison is made between the second set of answers and the third set of answers to determine an absolute value of the difference as being indicative of the level of empathy that the first participant has for the second participant.

A fourth further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the four sets of answers is given a number rating and wherein a comparison is made between certain of the two of the four sets of answers to determine a subjective empathy index between the first and second participants and wherein that index is an output that is provided by the system and method and wherein the output is made available for a period of time after completion of the answers by the participants to either or both of the participants.

A fifth further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein the four sets of answers are retained by the system for future academic research, other use, and possible sale.

A sixth further important object of the invention is to provide a system and method for determining empathy that allows a first participant to answer a plurality of questions some of which include personal information about the first participant for example, the sex or age, or any other desired information, and wherein the first participant is asked to provide two sets of answers to each of a remainder of the plurality of questions, a first set of answers being how the first participant feels about topics addressed in the plurality of questions and a second set of answers being how the first participant thinks a second participant would answer the same questions and wherein the second participant is also asked to answer the plurality of questions some of which include personal information about the second participant for example, the sex or age, or any other desired information, and wherein the second participant is asked to provide an additional two sets of answers to the remainder of each of the plurality of questions, a third set of answers being how the second participant feels about topics addressed in the plurality of questions and a fourth set of answers being how the second participant thinks the first participant would answer the same questions and wherein at least some of the answers are retained by the system for future use and possible sale.

A seventh further important object of the invention is to provide a system and method for determining empathy that obtains personal information regarding a first and a second participant, for example their names and respective genders, and which uses that information in the questions that are asked of each of the participants so that at least some of the questions make reference to the persons name or use a proper pronoun.

An eighth further important object of the invention is to provide a system and method for determining empathy between a first and a second participant that is adapted to identify a potential problem area in a relationship, for example a potential substance abuse, and which can provide a communication to either or both of the participants that alerts them to this potential problem area.

A ninth further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the fours sets of answers is given a number rating and wherein a comparison is made between certain of the two of the four sets of answers to determine a subjective empathy index between the first and second participants and wherein that index is an output that is provided by the system and method and wherein the output is further segregated into groups for example, a first group being health and fitness, a second group being lifestyle, a third group being sexuality, a fourth group being conflict resolution, and a fifth group being morality and spirituality so as to allow the participants to determine a respective empathy group index for any of the groups.

A tenth further important object of the invention is to provide a system and method for determining empathy that allows a first participant to answer a plurality of questions and wherein the first participant is asked to provide two sets of answers to each of the plurality of questions, a first set of answers being how the first participant feels about topics addressed in the plurality of questions and a second set of answers being how the first participant thinks a second participant would answer the same questions and wherein the second participant is also asked to answer a similar plurality of questions and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the fours sets of answers is given a number rating and wherein a comparison is made between any two of the four sets of answers to determine a subjective empathy index between the first and second participants for any single question and wherein that index is used to generate an output that is provided by the system and method and wherein the output includes an overall empathy index score based on an averaging of all of the individual question indices.

An eleventh further important object of the invention is to provide a system and method for determining empathy that is adapted to measure the difference in views of two people by asking identical questions of each of the two people, and how each one of the two people thinks the remaining one of the two people will answer each question.

A twelfth further important object of the invention is to provide a system and method for determining empathy that is adapted to measure the difference in views of two people by asking identical questions of each of the two people, and how a first one of the two people thinks a second remaining one of the two people will answer each question and by assigning a numeric difference that is indicative of the difference between any answer provided by the second person as compared to that which the first person thought the second person would answer, wherein a smaller numeric difference is indicative of a greater level of empathy for any particular question.

A thirteenth further important object of the invention is to provide a system and method for determining empathy that is adapted to measure the difference in views of two people by asking identical questions of each of the two people, and how a first one of the two people thinks a second remaining one of the two people will answer each question and by providing a neutral dialogue appertaining to any individual question that may be of help in promoting further discussion and thereby, increasing future empathy.

A fourteenth further important object of the invention is to provide a system and method for determining empathy that is adapted to measure the difference in views of two people by asking identical questions of each of the two people and comparing the answers provided and when the answers that are provided by the two people are processed by the system and method and are deemed to suggest the presence of a potential significant specific problem, a listing of resources that may be available for help or treatment of the potential specific problem are also provided.

A fifteenth further important object of the invention is to provide a system and method for determining empathy that is adapted for use as a book or workbook.

A sixteenth further important object of the invention is to provide a system and method for determining empathy that is adapted to provide a boiler plate output of various possible resources that are available for contact by either of the participants to help with a potential problem regardless of the answers that are provided.

A seventeenth further important object of the invention is to provide a system and method for determining empathy that includes an Internet Service Affiliate Provider where the instant invention and its benefits are made available to other firms, organizations, or businesses on the Internet, the firms, organizations, or businesses being given an opportunity to refer any or all of their customers to the system and method for determining empathy.

An eighteenth further important object of the invention is to provide a system and method for determining empathy that includes an Internet Service Affiliate Provider where the instant invention and its benefits are made available to other firms, organizations, or businesses on the Internet on a referral basis, and when the firm, organization, or business providing the referral sends one of their customers to a web site of the instant invention and that referral results in a subscription by the customer of the instant invention including payment by the customer, then the firm, organization, or business that made the referral is kept track of (by tracking an address associated with the referral) and the firm, organization, or business shall receive a payment for making the referral, the payment consisting of a portion of the amount that was paid by the customer for use of the instant invention.

A nineteenth further important object of the invention is to provide a system and method for determining empathy that includes an Internet Service Affiliate Provider where the instant invention and its benefits are made available to a dating service, the dating service being given an opportunity to refer any or all of their customers to the system and method for determining empathy.

A twentieth further important object of the invention is to provide a system and method for determining empathy that includes an Internet Service Affiliate Provider where the instant invention and its benefits are made available to a dating service on a referral basis, and when the dating service providing the referral sends one of their customers to any source of the instant invention and that referral results in a subscription by the customer of the instant invention including payment by the customer, then the dating service that made the referral is kept track of and shall receive a payment for making the referral, the payment consisting of a portion of the amount that was paid by the customer for use of the instant invention.

Briefly, a system and method for determining empathy that is constructed in accordance with the principles of the present invention has a data base and operating software which allows a qualified first participant to answer a plurality of questions and wherein the first participant is asked to provide two sets of answers to each of the plurality of questions, a first set of answers being how the first participant feels about topics addressed in the plurality of questions and a second set of answers being how the first participant thinks a qualified second participant would answer the same questions and wherein the second participant is also asked to answer the same plurality of questions, except for an appropriate change in either the name or pronoun used to identify the second participant, and wherein the second participant is asked to provide an additional two sets of answers to each of the plurality of questions, a third set of answers being how the second participant feels about topics addressed in the plurality of questions and a fourth set of answers being how the second participant thinks the first participant would answer the same questions and wherein each of the fours sets of answers is given a number rating and wherein a comparison is made between the first set of answers and the fourth set of answers to determine an absolute value of the difference as being indicative of a first empathy index that the second participant has for the first participant and wherein a further comparison is made between the second set of answers and the third set of answers to determine an absolute value of the difference as being indicative of a second empathy index that the first participant has for the second participant and wherein each index is part of an output that is provided by the system and method and wherein at least a part of the output is made available for a period of time to either or both of the participants. The participants may also be asked to each answer certain specific questions about themselves, for example their sex, age, or any other desired information, such as their level of education, for example. Any of the answers provided can be retained by the data base as data for possible future use which may include segregating the data by age, sex, or any other parameter, removing any aspect of the data, for example removing the names of the participants to obtain a raw data, and selling at least a portion of the raw data. For such preferred utilization, the data base and operating software are remotely located and are accessible by the participants over the Internet upon payment of a fee. Also potential problem areas can be detected by the system and method and the participants can be alerted to this potential and possible remedial or therapeutic resources that are available. According to a modification, the software and instructions are provided to for use in a personal computer. According to a third modification, in the case of a book, instructions for performing manual calculations are provided along with worksheets in the book or, alternatively, software for use with a personal computer are optionally included along with the book whereby the answers are entered into the personal computer and the resultant empathy scores are calculated by the software in the personal computer. Use of the invention via an Internet Affiliate Service Provider type of arrangement is also disclosed.

BRIEF DESCRIPTION OF THE DRAWINGS

APPENDIX A is one possible ten page flowchart for a system and method for determining empathy.

APPENDIX B is a sample output that includes 72 possible questions for use in a system and method for determining empathy, answers from two fictitious participants, and a summary report page, on 19 pages.

APPENDIX C is a listing of helpful resources that may be included as part of the sample report on four pages.

APPENDICES D1–D8 is a sample of 8 possible screens on 14 pages associated with registration, logon, and use of the instant invention.

APPENDIX E is a sampling of six pages (out of 72 total in this example) of questions as they would likely appear on a computer monitor screen to Diane.

DETAILED DESCRIPTION OF THE INVENTION

Figure 1:
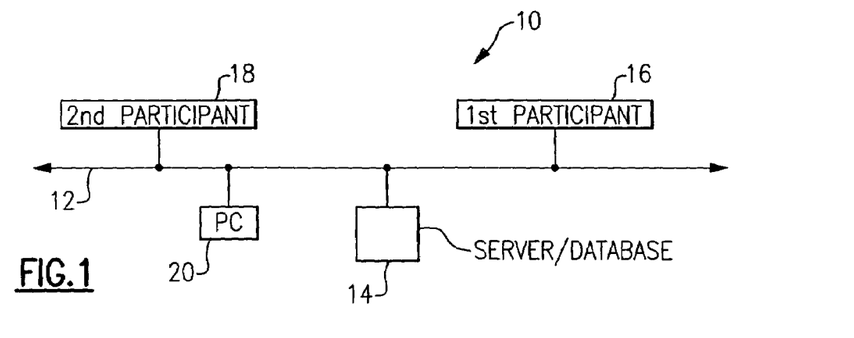
FIG. 1 is a block diagrammatic view of a system and method for determining empathy.
Figure 2:
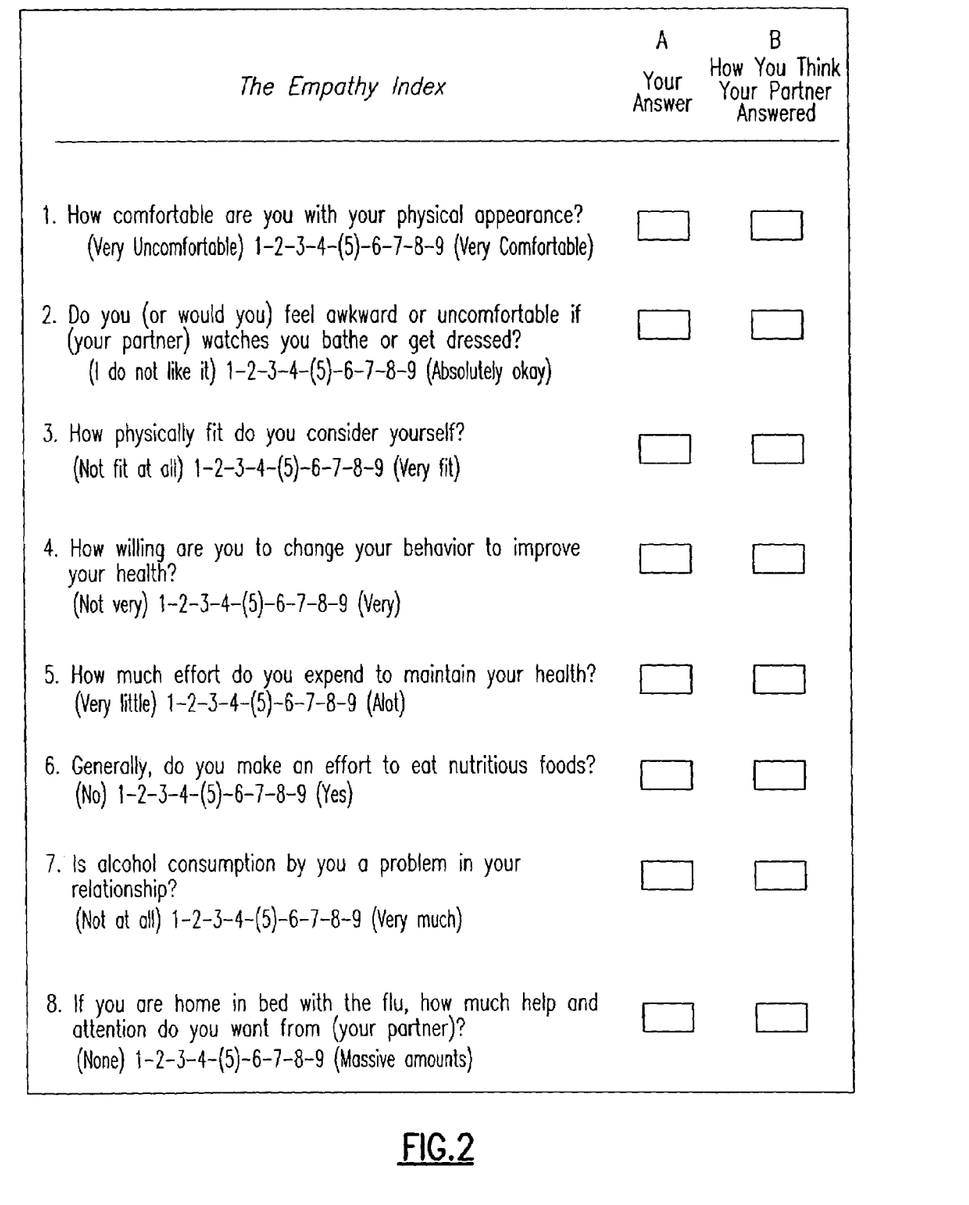
FIG. 2 is a sampling of a few possible questions and answers that can be asked of a first participant.
Figure 3:
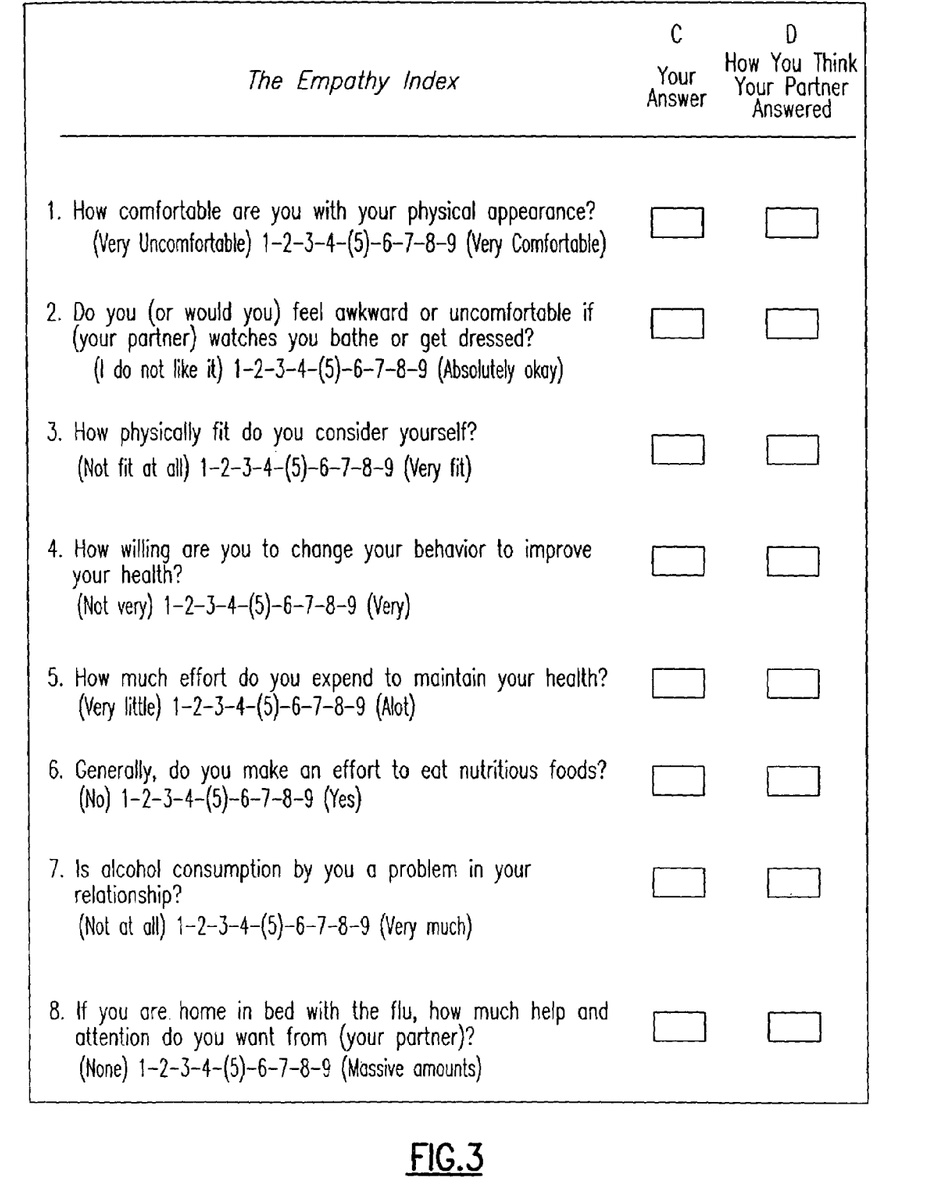
FIG. 3 is a sampling of the same questions and answers that can be asked of a second participant.
Figure 4:
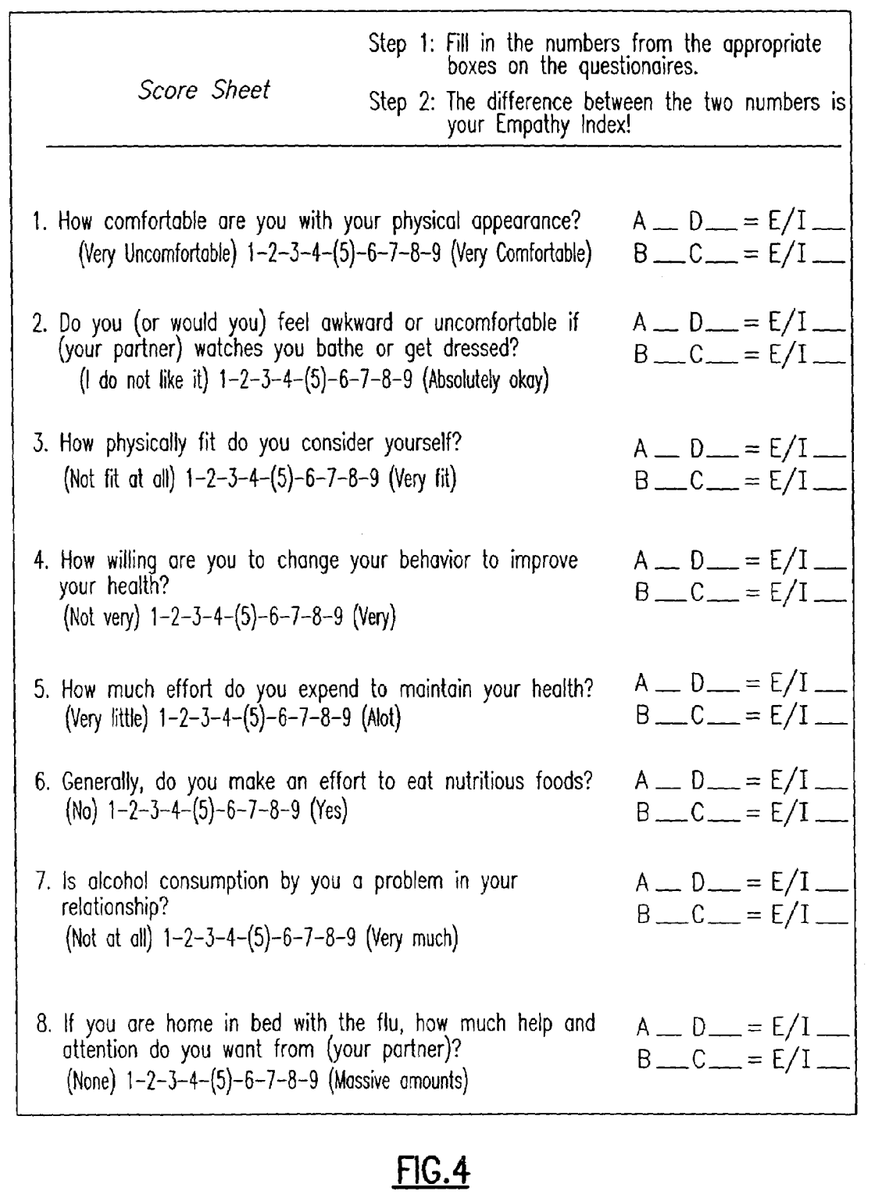
FIG. 4 is a sampling of a score sheet used as an output to indicate a first and a second empathy index for the participants.

Referring to FIG. 1 and on occasion all of the FIGURE drawings and appendices is shown (FIG. 1), a system and method for determining empathy, identified in general by the reference numeral 10.

An Internet 12 provides an area network to allow access to a server/data base 14 by a first participant 16 and a second participant 18.

As the system and method 10 is used to determine a subjective level of empathy between two people, the first and second participants are intended to represent these two people. Of course, the system and method 10 is expected to be used by many couples (i.e., pairings of two people) who wish to assess their level of mutual empathy because they have a desire either to deepen their level of intimacy or perhaps to remedy a deficit.

It is useful to note that a primary intention behind the system and method 10 is to assist couples that are either involved in or are contemplating a romantic or a potential life-partner type of relationship. They may be in the early stages of a dating relationship and one or both of them may wish to determine how well they are beginning to develop empathy for one-another. After they have been dating for a longer period of time they may wish to re-take the "empathy test" to see how they are progressing or to identify deficit areas of empathy in their developing relationship.

Many couples that are well into their intimate relationship are anticipated to utilize the system and method 10 including for example, many married couples.

These couples are anticipated initially to be primarily heterosexual couples although the system and method 10 certainly has utility in measuring the empathy levels for same-sex couples. The questions can be modified to better assess the empathy levels for certain of the specific issues that same-sex couples are likely to deal with.

There are many features and nuances to the system and method 10 that are further revealed through an in depth review of the accompanying appendices, flowcharts, and software that are not discussed in detail because while they represent improvements to the system and method 10, they are not necessary to a basic, essential understanding of the system and method 10 or of its claimed elements. Those skilled in the art can, after having had benefit of this disclosure, refer to the accompanying appendices, flowcharts, and software for a more detailed understanding of the features of the system and method 10. As is well known in the software arts, there are of course almost a limitless number of possible iterations of software that can be developed that mimic various aspects of the functionality of the system and method 10.

Assuming that the first participant 16 and the second participant are a "couple", the first participant 16 is expected to log onto the system and method's 10 server 14 over the Internet 12. Referring in particular also to APPENDIXES D1–D8 and E, the first participant will initially be shown a home web page and given an opportunity to view sample question(s) and answer(s) in order to get a "feel" of how the system and method 10 works. They can choose the path they take depending upon whether they are a new customer or an existing customer or merely wish to exit the page without subscribing or otherwise participating.

While on the home page, or other pages, they will have an opportunity to select other pages to go to. For example, they can elect to go to (i.e., to vector) to a "Terms and Conditions" page that explains the terms and conditions that limit usage or replication of the system and method 10. Another page a participant may elect to go to is a "Why Empathy" page that explains the benefits of empathy in relationship. Each "page" may include several computer screens to view all of the information that is presented. Other elective pages include a "How it Works" page, a "Help" page, a "Registration" page that is mandatory to register and pay, as required, for the use of the system and method 10 (i.e., in order to take the empathy test) and a "Log in" page that each participant must go to some time after having completed registration in order to be presented with the actual questions. Other pages can be added as desired or pages can be combined. For example, a sample question and answer page can be provided or it may be included as part of one of the above mentioned pages.

Assuming the first participant 16 is a new customer, he or she will be given an opportunity to go to the Registration page (i.e., screen) if the first participant 16 wishes to register which includes the payment of a fee, preferably by credit card. If the first participant 16 wishes to view the "Terms and Conditions" screen prior to registering, such opportunity is also provided. If desired, the first participant 16 may be required to click a location on the Terms and Conditions (or other) page that indicates their acceptance thereof prior to being allowed to go to the registration page.

The first participant 16 will then be asked to enter for example, his or her first name, gender, his or her partner's first name (i.e., the second participant 18), and the partner's gender, and well as the first participant's e-mail address.

The current date is also shown as well as instructions that the questionnaire must be completed within a predetermined period of time, for example, 60 days.

The fact that no answer is a right (or wrong) answer is also stated as well as the fact that the questionnaire is used only to measure empathy, i.e., how well you understand your partner's views and feelings and how well your partner understands yours. This and considerably more information may be presented on any of the pages (i.e., screens) as desired including those that are available after Log in. More pages can be added as desired.

It is important that the participants 16, 18 understand that the answers are not "judged" as being right or wrong, good or bad, better or worse than other answers. With the exception of those few questions for which certain answers may suggest the presence of a serious problem (i.e., a substance abuse or spousal abuse issue, for example) the answers are not critiqued.

It does not matter, for example, what your religious views are or what your partner's religious views are. No view is seen as being either right or wrong. What matters, for this particular example, is how well you understand and are able to identify with your partner's religious views, that is how well you are able to understand what they are (i.e., anticipate your partner's response for each question) and how easy it is for you to make space for those views, whatever they may be, as well as the reversal where how well your partner understands and makes space for your own religious views, are measured to one degree or another. The system and method 10 is not meant to change ones own views or standards but is meant to stimulate discussion of viewpoints, and is especially useful in doing so by identifying where an empathic connection may be lacking.

It is important to again stress that there is no right or wrong answer to any question. Each answer is what it is. What matters ultimately, is how well each person is able to identify with and understand the other person regarding any particular question or grouping of questions that may be posed by the system and method 10.

This is fundamentally different than any previous type of a compatibility test in which each person's beliefs and attitudes are tallied, where differences are seen as "bad" or as "incompatibilities" and where similarities are seen as "good" or as "compatibilities".

The system and method 10 reveals how people with vast individual differences can nevertheless live compatibly and in harmony simply because they have empathy for their differences, instead of judgments against them. When compared with the system and method 10, prior compatibility assessments appear, at best, as rudimentary and primitive test mechanisms and, at worst, as incorporating a fundamental model of human interaction that is simply wrong.

Certain current attraction theory teaches that we are unconsciously drawn to many of the differences our partners bring because we want to heal ourselves from past traumas and the resultant repressed parts inside of us, so that we may become more whole and integrated as human beings. That is to say following a previous example, the exercise resistant person may well be drawn to the pro-exercise person because the exercise resistant person wants to heal their own resistance to exercise and develop, perhaps, a healthier lifestyle, one that places more emphasis and value on taking care of their own body. Conversely, it is possible that the pro-exercise person also wants to learn how to kick back and relax, perhaps have a milkshake now and again, and not excessively worry over a missed day of exercise. A compatibility test would see this as a difference in values or goals that could suggest potential incompatibility where in reality this difference might be part of the drive behind their attraction.

The system and method 10 can instead be used to detect these differences without judgment. The system and method 10 is used to reveal how aware the participants 16, 18 are of the needs of the other. A high level of empathy where there exists a difference is seen as being just as wonderful, just as connected, just as empathic, as a high level of empathy where there is a similar attitude. The differences do not matter when there is both awareness and acceptance.

An empathy model can be used to form a basis that permits compatibility to thrive amid a sea of individual differences. The system and method 10 suggests that it is wise to measure empathy levels between people rather than any set of differences. The differences simply do not matter when empathy is good.

It is important to note that the actual questions and an ability to answer them does not occur until registration is complete for both each participant 16, 18, respectively. After registration is complete, each participant 16, 18 must eventually then go to the Log in page where they are further directed (i.e., vectored) until they are presented with the questions. They can vector to the log in page anytime after registration, can elect to answer all or a few of the questions, exit, come back, change their answers, etc. After initial registration is complete, each participant 16, 18 can log off without having vectored to the Log in page nor having answered any of questions and defer doing so until a later time. What is essential that registration be completed before the participants 16, 18 are allowed opportunity to answer any of the questions.

The method and system 10 uses the intake information to calculate the gender associated with the first names and to modify the questions accordingly. If the two participants are named Kathy and Larry, then the questions each participant receives will be modified accordingly.

For example, one question posed to Kathy might be, "Kathy, does tension from work affect your relationship with Larry?" to which Kathy can answer from one to nine with a one being "not at all" and a nine being "very much". Kathy answers the question about herself and the server 14 records her answer. Let us assume that Kathy has answered "3" to this question. The software has substituted the appropriate names and pronouns.

Then Kathy is asked to estimate how Larry would answer the same question. Kathy is first asked, "How do you think Larry answered this question?" The question posed to Kathy about how Larry will answer would be phrased as, "Larry, does tension from work affect your relationship with Kathy?", and again Kathy would answer from one to nine as she thinks Larry would answer. Let us assume Kathy picks a "4" as her guess as to how Larry will answer this question when it is asked of him.

In essence, the same question is asked with only a substitution of names, as required. By asking the same question, changing only the names, the effect is to minimize the chances of interpreting the questions differently. This increases reliability of the test results.

The object for the second phrasing of the question is to allow Kathy to guess as accurately as she can how Larry feels about the topic. An ability to know how Larry (her partner) will answer is indicative of her level of empathy for Larry regarding his views, beliefs, attitudes, and feelings.

The same question asked in two ways about how Kathy feels and about how Kathy thinks/imagines Larry feels helps to determine two things: 1. How does Kathy feel about a topic and 2. How well does she know how Larry feels about the topic.

All of the questions that Kathy must answer will similarly seek to determine how Kathy feels about the topic and also how she thinks Larry feels about the same topic.

The software can be modified, if desired, to allow Kathy to skip questions, to go back to them later, to answer them and then go back, reconsider and possibly change her earlier answer(s). Many of these are programming considerations that hinge on the benefits as compared to the complexity incurred to the system and method 10. She can keep changing her answers until both she and Larry are each individually satisfied with their own answers (i.e., without any collaboration between the two). When both participants 16, 18 are done answering the questions they will indicate to the system and method that they are done.

The system and method 10 will prompt each participant 16, 18 if so programmed and if there are unanswered questions which they can then either answer or elect to mark the question as N/A for either Not Applicable or Not wish to Answer. Certain people may refuse to answer some questions for a variety of reasons. If any questions are permanently marked as N/A, the system and method 10 will calculate the results (i.e., the empathy index) even though there are some unanswered questions as best as it possibly can. The system and method 10 still has value but omitting answers is not recommended.

If any question is marked N/A by either participant 16, 18 the system and method 10 does not calculate empathy for that question and that question is not considered (i.e., included) in the overall empathy index calculation.

Larry is also given the same opportunities to answer questions picking the answer for each question that states how he feels about the topic as well as guessing how Kathy would answer the same question.

Upon subscription to this service provided by the system and method 10, Kathy and Larry will be given a predetermined period of time to answer all of the questions. Failure to do so in time, presently sixty days, will cause a lapse to occur resulting in the possible abandonment of her subscription. Whether she must re-subscribe at full price and repeat the entire question and answer process or whether her previous answers will be retained requiring her to answer only those not previously answered and pay a surcharge of some sort are design variables for dealing with a lapsed subscription and can be implemented and changed as desired.

If Kathy is the first participant 16, then Kathy will register and pay the required fee on her credit card and enter the data as described hereinbefore before any of the actual questions are answered.

During registration Kathy, the first participant 16, will be given a Logon-ID (possibly an alpha-numeric identification string) to be used whenever she logs on to the system 10 in the future. This is necessary in order to answer any remaining or unanswered questions or to review her previous answers.

The system 10 generates the Logon-ID and has guidelines in selecting the Logon-ID for Kathy, and also in selecting one for Larry, who will have a slightly different Logon-ID than Kathy. The Logon-ID is preferably of the form "IIXXXXS" where "II" includes the registrant's initials, "XXXX" is a randomly generated character, and "S" is a suffix "A" or "B". Accordingly, both Kathy and Larry would have the same Logon-ID except for the suffix "A" or "B". An individual password is chosen by each participant 16, 18, in this example Kathy and Larry, and is expected to be kept confidential. The software would of course have to check its own internal Logon-ID file to prevent duplication of any ID that some other participant (not shown) may be using. A unique Logon-ID for each participant 16, 18 pair is always provided at registration by the system and method 10.

If Larry was the first person of the couple to subscribe (i.e., to register), then he would, of course, be referred to as the first participant (not in this particular example). Either person may be the one who initially subscribes.

The system and method 10 then prompts both the first and second participants 16, 18 when they attempt to first logon to the system 10 to select a unique password. A secret question may also be entered and answered by each participant 16, 18, retained by the system's 10 server 14 for use in case the password is forgotten. This is but one possible approach to recovery of a forgotten password. If the password is forgotten, the system and method then presents the secret question, a correct answer to which results in transmitting the forgotten password to the email addresses provided during registration.

From then on, whenever logon occurs, both the Logon-ID and the password must be entered. This allows each participant 16, 18 to complete the questionnaire at their own convenience and from their own location. Both could be on line at the same time or at different times.

When both have finished answering all of the questions and indicated to the system and method 10 that they are satisfied with their answers, the data collected is saved by the server 14. It is used to assess the empathy level, i.e., to generate an empathy index, for each participant regarding the other.

An overall empathy index is created and it is an average of the empathy indices of all of the questions that were answered by each participant 16, 18. The overall empathy index for Kathy, for example, reflects an average level of her empathy for Larry regarding all of the questions and all of the topics. Conversely, the overall empathy index for Larry reflects an average level of his empathy for Kathy regarding all of the questions and all of the topics.

A group empathy index is also created for any group of questions, such as for those questions appertaining to health and fitness, lifestyle, sexuality, conflict resolution, morality and spirituality, or any other desired grouping.

This is useful because Kathy may have great empathy for Larry generally but have poor empathy in one particular area, say health and fitness. Being aware of a group, a topic in which empathy is generally lower than other areas, alerts and allows Kathy to engage in discussions with Larry so as to learn more about his attitudes concerning health and fitness.

It is also useful to be able to confirm those topics where empathy levels are especially good, in that one would expect these areas to be areas where there is less conflict and more satisfaction arising from the relationship.

It does not matter so much that both participants 16, 18 share the same attitudes, but what is supremely important is that they know and accept the attitudes, beliefs, values of each other sufficient to make room for them in the relationship. It is this knowledge, this knowing of the other person and an accepting of whom he or she is that creates feelings of love, comfort, and safety and which decrease areas of tension and conflict.

Again, the intent is not to change anyone's views but rather to stimulate discussion so that these views are well understood by both parties. What they do with the differences that exist between them is of course up to them and well beyond the scope of the system and method 10. As mentioned before, they may make allowance for certain differences that are not deemed to be essential. That is a normal thing for couples to do. If an impasse involving essential views were to arise, for example, then one option would be to seek professional counseling to determine if there is a way to get beyond the impasse. Perhaps further discussions between the parties can resolve the difference. The system and method 10 cannot solve problems. That is not its intention. It is not a substitute for therapy or professional counseling. It does measure empathy and provide an empathy index that can be useful in stimulating further discussions.

It is either non-understanding or non-acceptance that creates conflict. From non-understanding inadvertent and periodic injury occurs. From non-acceptance, pressure to change arises. Neither helps to build intimacy and trust. Empathy is a measure of both understanding and acceptance. Empathy, which can also be loosely defined as the combination of knowing, caring, and the accepting of another person is the cornerstone in the building of a healthy relationship.

Larry, upon logon and selection of his password will have opportunity over the same course of time (i.e., sixty days) to answer the same questions as Kathy, only modified for his name and using pronouns appropriate for his and Kathy's gender.

Continuing the illustration using the previous sample question (note: all questions are subject to change) Larry will be asked to answer this question, "Larry, does tension from work affect your relationship with Kathy?" grading it from one to nine. Let us assume he gives it a "5". He would then also be asked "How do you think Kathy answered this question?", "Kathy, does tension from work affect your relationship with Larry?" trying to imagine how Kathy will have answered. Let us assume he thinks Kathy will give this question a "7", which suggests that he feels Kathy's ability to relate to him is certainly somewhat affected by her work tensions.

After the results for both participants 16, 18 are ready for calculation, the system 10 compares the differential for each question in absolute value as an empathy index for that question.

For this example, Kathy graded herself a "3" whereas Larry thought she would answer a "7", providing a raw score of 7/3 and an empathy index (absolute value of difference) of 4. This shows that Larry's empathy level for this particular question indicates some disparity. Accordingly, an empathy index, question by question, is also preferably provided as part of the output of the system and method 10 and is useful in further clearing up the perceptions and especially the misperceptions that the participants 16, 18 may have regarding each other.

For the other "half" of the question, we see that Kathy thought Larry would have scored a "4", but that Larry gave himself a "5" revealing a raw score of 4/5 and an empathy index of 1.

A low empathy index is indicative of a high level of empathy. A high empathy index is indicative of a low level of empathy. The lowest empathy index possible which indicates a perfect empathy score for any given question is "0". It does not matter what the answers are, whether they are both a "1" or a "9" or anywhere in between to get a perfect empathy index score. All that matters is both participants 16, 18 chose the same answer with regard to how they thought the other person would answer the question as compared to how the other person actually did answer the question. This is why no answer is right, no answer is wrong. The system and method 10 is not about right or wrong answers. Neither is it about a tally of values or goals, etc. Instead, it is about how well or poorly does each participant 16, 18 empathize with the other.

The highest empathy index score possible is 8 (when one participant answers "9" and the other answers "1" for any question. This indicates the least amount of empathy for that particular question because the partner's answer was in fact the exact opposite to what one thought he or she would answer. Of course, the answer scale can be changed from a range of one to nine and a different empathy index range can be provided with either a wider or smaller range of answers possible.

In any event, the lower the empathy index, either for an individual answer, the average for a grouping of answers, or the average for all of the questions so as to provide the overall empathy index is indicative of a high level of empathy for the other person.

As can be seen, it is entirely possible that one (say the first) participant 16 can have high empathy levels (i.e., a low index) for the other (second) participant 18 whereas the second participant 18 can have generally low levels of empathy (i.e., a high index) for the first participant 16. This does not mean that the two participants 16, 18 are incompatible. Not at all. It merely suggests that they have areas to discuss, clarify, and learn more about each other. For a fledging relationship, one could not expect otherwise. For a seasoned long-term relationship, a disparity in understanding can provide both the impetus and direction for further discussions that may lead to a deepening of understanding and intimacy in their relationship. The system and method 10 provides an effective tool for all of the participants 16, 18 to deepen their understanding of one-another, their empathy, and ability to love.

The system and method 10 for each question calculates an empathy index for each question (for each person) and it may include a single boiler plate text as part of the output along with each question and index score that provides a neutral dialogue concerning that question and the index scores. It may be generic and congratulate the participants 16, 18 when the index is below a predetermined number, for example, a "2" or lower. It may suggest some discussion about the topic occur for a higher score and it may urge discussion for a very high index score for any question or grouping of questions. The boiler plate text that accompanies the question and index score is also expected to flag potential problems as mentioned above, for example substance or spousal abuse, and to provide a list of possible resources when available and appropriate.

Further modifications to the system and method 10 may include referrals to organizations, therapists, support groups, etc. The system and method 10 can also be modified for assistance in purchasing resource materials, for example books for reading. The actual purchasing of materials would occur off-site on another web page (i.e., not by the system and method 10) whereby the system and method 10 would only get credit and possible remuneration for the referral and resulting sale.

As the system and method 10 evolves over time, the responses to each question can include a greater level of programming sophistication other than having only one boiler plate text as the output response for each question, wherein certain responses (i.e., different possible boiler plate text responses for the same question) are provided based on the individual responses, for example how close or far apart the empathy indices are. An empathy index for both participants 16, 18 for one particular question of zero (perfect empathy) might result in the selection of a particular response that congratulates how well they know each other for that topic. Whereas a higher empathy index for one question could result in the selection of a more tailored response that talks about the nature of the question and suggests that they have further discussions.

The participants 16, 18 are provided with their respective empathy indices for the individual questions, groups of questions, and overall empathy index to use as they see fit. This data is also collectively saved and may be used for other purposes.

For example, participants 16, 18 may use the system and method 10 to obtain their empathy indices more than once, possibly several times.

Trends in relationship may be useful to track as well as gender, or age-based, patterns. Any desired information can also be collected by programming in the appropriate questions. Some of these questions may be imbedded in the actual questionnaire, others may be obtained as part of the registration process.

For example, upon registration it may be desirable to determine the nature of the relationship, are they married, do they live together and if so for how long, how long have they known each other, have they been physically intimate with one-another and for how long, how does each person rate their satisfaction level with their partner, etc.

It may even be possible to modify the software so as to allow a previous subscriber to log on and indicate if a relationship has ended, either through separation or divorce.

This information when compared to any aspect of their empathy index can be very useful in establishing statistically valid predictors to indicate success or failure, joy or sorrow, in relationship. This information may also be used to establish remedial options so that failure possibly can be averted, for example through specific models of dialogue that increase mutual empathy.

Researchers may want such raw data (absent the names and other personal or traceable information) for analysis purposes. Accordingly, any portion of the data that is collected can be sold as well, either as raw data or after calculation of any empathy index.

Some researchers may be interested in a particular segregation or category of data, for example, what are the empathy index scores of people who have been married at least ten years and who indicate a high level of satisfaction from their marriage. Others may be interested in the empathy index scores of people who have been married at least ten years and who indicate a low level of satisfaction from their marriage.

Various groupings and uses of the data that is collected are possible. Other researchers may be interested in tracking the longevity of relationships after intercourse as a function of empathy.

If enough people subscribe to the system and method 10, it becomes a source of incredibly valuable data from a statistical point of view.

Another unexpected benefit provided by the system and method 10 is that potential "red flag" problems like substance abuse can be detected and flagged. It is possible that if asked a question about the quantity or frequency of alcohol consumption, perhaps as a "lifestyle" question, both Larry and Kathy answer "9", that it is very high for one of them. While it is true that they both answered the same and have a low empathy index (i.e., a score of "0" for perfect empathy) for this question, there nevertheless remains a potential substance abuse issue. Accordingly, the software can be modified and used to generate a gentle urging to seek appropriate professional help in determining whether or not alcohol consumption may be a problem.

Similar warnings and other possible urgings to see health care professionals can be provided whenever either an extreme deficit or an extreme excess is detected (possibly by only one participant, possibly by both). For example, questions about diet or exercise, if answered to the extreme can indicate a potentially serious condition, for example possible anorexia or an obsessive or compulsive tendency to do something or to avoid doing something. Professional diagnosis and psychological counseling may be warranted. By providing such a warning or urging to seek professional help, the system and method 10 may do more than improve relationships, in such instances it may even save lives. Certainly it can be used to improve and, accordingly, prolong relationships.

At present, the system 10 provides a separate report of available resources for various categories regardless of the answers provided by the participants 16, 18 (See APPENDIX C). For example, resources for contact in dealing with substance abuse, alcoholism, spousal abuse, therapists and counselors, and other resources as are available and which are deemed to be desirable for inclusion in the separate report, are provided. Later modifications to the system 10 can, if desired, either omit or provide certain of these resources based on an analysis of specific answers that were provided.

The participants 16, 18 access the server 14 to obtain the results (which is the systems 10 output) after both participants 16, 18 have finished answering the questions. There are options how the results are provided. Either of the participants 16, 18 may review the answers on their own personal computer screens, each question having an answer that takes up one or more computer screens. If they wanted, they could print any particular screen. Or, alternatively, the results are downloaded over the Internet 12 to the personal computer(s) of each participant 16, 18. A default directory and address is proposed for IBM or Macintosh based systems, as desired, if this option is elected. The default can be modified as desired. The participants 16, 18 are then able to review the results at their leisure and easily print the results and use them for further discussion.

The total number of questions asked of the participants 16, 18 is a variable as are the topics. It is desirable to include a sufficient range of questions to establish a wide range of topics for empathy verification without making the "test process" too burdensome. It is intended to be an enjoyable, even a bonding experience. Its completion is not intended to become a chore that is to be avoided. A preferable number of questions range from under 50 to over 100, each question having the two sets of answers for each participant to answer as has been previously described, with about 70 to 85 "base" questions providing an especially manageable number.

There are many potential topics for consideration. For example, physical appearance, personal hygiene, body odor, manners and courtesy, perceived intelligence, financial security, ambition, kindness, respect, loyalty and fidelity, sense of humor, sexual issues, spiritual and political issues, honesty, commitment, responsibility, interests, attitudes toward friends and family, and household chore issues are but a few of the many topics leading to the formulation of questions and to the potential groupings of questions that are possible for inclusion in the system and method 10.

It is also possible to include the system and method into a software package that can be sold and used with a personal computer 20 whereby the participants are able to take the "test" at home. The software package that is used with the personal computer 20 can be sold in a retail store (not shown) or the package may be made available and downloaded through the Internet 12 after payment of a fee. Such fee payment and downloading would be handled by the server 14. If the software package is to be downloaded, it is necessary for the personal computer 20 to be functionally connected to the Internet 12. The results are calculated in the personal computer 20 and output as desired to a printer (not shown).

Other modifications are also possible. For example, it may be possible to register, download the questions to the personal computer 20, answer the questions in the personal computer 20, and then upload the answers to the server 14 to calculate the empathy index. The results can then be handled as described above in a variety of ways.

Figure 5:
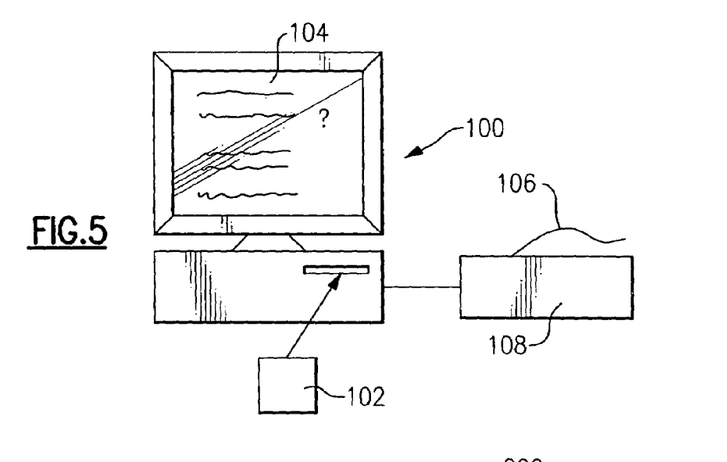
FIG. 5 is a block diagrammatic view of a first modification wherein the software is provided for use in a personal computer.

Referring now to FIG. 5, is shown a modified personal computer 100 in which a first modified version of the system 102 is provided in machine-readable form and is loaded into the personal computer 100. Instructions and questions are displayed on a monitor screen 104. The questions are answered using a keyboard (not shown). The results can be displayed on the screen 104 or can be output on paper 106 from a printer 108.

Figure 6:
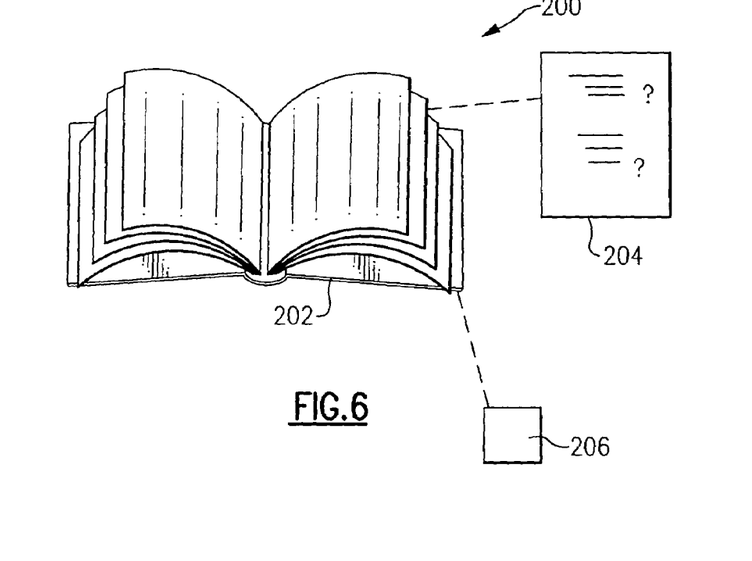
FIG. 6 is a view in perspective of a second modification wherein a workbook is provided for use of the system and method and wherein an optional software is provided.

Referring now to FIG. 6, is shown a second modified system 200 in which the questions and instructions are provided in a workbook 202. The workbook 202 is in book form and may include pullout or tear-off sheets 204 for use by each participant 16, 18. The answers can be recorded on the sheets 204 or elsewhere in the workbook 202 as desired. Instructions are provided on how to compare the completed answers so as to generate the overall empathy index as well as the various empathy indices and how to have fruitful further discussions. If desired, a computer readable media source 206 can also be supplied with the workbook 202 to assist as desired. For example, the media source 206 may provide sufficient software to permit entering the answers to the questions in the workbook 202 directly into the personal computer 100 (see FIG. 5) and to calculate the results (i.e., the various empathy indices).

Referring again to all of the drawings, other empathy indices can be calculated as well, for example, the overall average empathy index of both participants 16, 18 can be averaged together to provide a "partnership empathy index" for the couple (See last page APPENDIX B).

It is also anticipated that the system and method 10 will be made available as an Internet Affiliate Service Provider type of arrangement. For example, a dating service (not shown) that is either Internet based (preferable) or not, may desire to provide their customers with even greater levels of service. It is clearly in the dating service's best interest that the customers that they "match" together fare well together. This would bode well for the service that the dating service provides.

Accordingly, the dating service may include a referral that allows their customers, if the customers so choose, to access the system and method 10. The most common method is that the dating service would provide a "link" on their (the dating service's) web page (site) that, if selected by any of their customers, would immediately refer the customer to a web page (site) that allows them either access to more information or preferably and opportunity to immediately subscribe to use (and pay for that use) of the system and method 10.

The address of the dating service that made the referral would be saved by the system and method 10 (or a third party that could be contracted to provide this referral service). If the customer subscribes and pays for that subscription, then the dating service that made the referral would be entitled to an agreed upon payment for making that referral (which would be a part of the total fee paid by each customer (or pair of customers) to use the system and method 10).

In this way, the dating service gains in two ways. They gain additional revenue through the referrals they make (i.e., of their customers) to the system and method 10 that actually subscribe. They also gain because it is believed that those who do make avail of the system and method 10 are more likely to succeed as a couple that is better aware of the views and feelings of their partner. Dating services that have a higher success rate for their matches are likely to become more popular and able to command a higher premium for their services.

The owner's of the system and method 10 gain in that referrals help to generate additional business (i.e., revenue).

Other firms, organizations, and businesses may similarly wish to make use of an ability to refer their customers or employees to the system and method 10 for any of a variety of possible reasons. Businesses may want their employees (who are in partnerships) to benefit emotionally from the system and method 10. Counseling services may be similarly inclined.

There are many other variations, adaptations, and other design nuances those skilled in the system design and programming arts can implement as desired. For example, after the system and method 10 has calculated the various empathy indices, the results are made available for a predetermined period of time, for example twenty days, during which time the various result screens can be viewed or the results downloaded as described hereinabove.

APPENDIX A shows one possible ten page flowchart for a system and method for determining empathy.

APPENDIX B is a sample output that includes 72 possible questions for use in a system and method for determining empathy, answers from two fictitious participants, and a summary report page, on 19 pages.

APPENDIX C is a listing of helpful resources that may be included as part of the sample report on four pages.

APPENDICES D1–D8 provide a sample of 8 possible screens on 14 pages associated with registration, logon, and use of the instant invention.

APPENDIX E is a sampling of six pages (out of 72 total in this example) of questions as they would likely appear on a computer monitor screen to Diane.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A product embodied on a computer-readable medium for determining empathy, comprising:
   (a) means for presenting a plurality of questions to a first participant and wherein said first participant is required to provide a first set of answers to at least some of the plurality of questions and wherein said first set of answers represent said first participant's views and wherein said first participant is also required to provide a second set of answers to said at least some of the plurality of questions attempting to anticipate how a second participant will answer each of said at least some of the plurality of questions;
   (b) means for presenting said plurality of questions to said second participant and wherein said second participant is required to provide a third set of answers to said at least some of the plurality of questions and wherein said third set of answers represent said second participant's views and wherein said second participant is also required to provide a fourth set of answers to said at least some of the plurality of questions attempting to anticipate how said first participant will answer each question;
   (c) means for recording said first set of answers, said second set of answers, said third set of answers, and said fourth set of answers;
   (d) means for mathematically comparing at least two answers either from said first set of answers to said fourth set of answers or from said second set of answers to said third set of answers sufficient to produce a numerical result that is representative of an average difference in the absolute value between said at least two answers, and wherein said average difference includes an empathy index for said topic; and
   (e) means for providing said empathy index to said first participant and to said second participant.

2. The product of claim 1 wherein said at least two answers appertain to a common topic and wherein said empathy index is for said common topic.

3. A system for determining empathy, comprising:
   (a) a database including an operating software wherein said operating software is adapted to present a plurality of questions and wherein a first participant is required to provide a first set of answers to at least some of the plurality of questions indicating the first participant's views and wherein said database includes means for storing said first set of answers on a computer-readable media and wherein said first participant is also required to provide a second set of answers to at least some of the plurality of questions attempting to anticipate how a second participant will answer each question and wherein said database includes means for storing said second set of answers on said computer-readable media and wherein said operating software is adapted to present said plurality of questions to said second participant and wherein said second participant is required to provide a third set of answers to at least some of the plurality of questions indicating the second participant's views and wherein said database includes means for storing said third set of answers on said computer-readable media and wherein said second participant is also required to provide a fourth set of answers to at least some of the plurality of questions attempting to anticipate how the first participant will answer each question and wherein said database includes means for storing said fourth set of answers on said computer-readable media;
   (b) means for comparing at least two of the sets of answers to establish a difference between an absolute value that is assigned to each answer for each question and wherein said means for comparing is configured to average said absolute value for a plurality of questions, and wherein said absolute value for a plurality of questions includes an empathy index, said empathy index providing an indication of either how well said first participant understands an aspect of said second participant appertaining to at least one topic covered by said questions or how well said second participant understands an aspect of said first participant appertaining to said at least one topic covered by said questions; and
   (c) providing said empathy index to said first participant and to said second participant.

4. The system of claim 3 wherein the first set of answers is compared with the fourth set of answers to generate said empathy index and wherein said empathy index is indicative of how well said second participant understands said first participant.

5. The system of claim 4 wherein each question includes a range of answers and a numeric value that is assigned to any selection that is made within the range of answers, and wherein said absolute value of the difference between the selection provided to each question in the first set of answers and the fourth set of answers is calculated and is used to generate said empathy index for that question, and wherein a low absolute value is indicative of a high level of understanding that said second participant has for the views of said first participant.

6. The system of claim 3 wherein the second set of answers is compared with the third set of answers to generate said empathy index and wherein said empathy index is indicative of how well said first participant understands said second participant.

7. The system of claim 6 wherein each question includes a range of answers and a numeric value that is assigned to any selection that is made within the range of answers, and wherein said absolute value of the difference between the selection provided to each question in the second set of answers and the third set of answers is calculated and is used to generate said empathy index for that question, and wherein a low absolute value is indicative of a high level of understanding that said first participant has for the views of said second participant.

8. The system of claim 3 wherein the first set of answers is compared with the fourth set of answers to generate said empathy index and wherein said empathy index is indicative of how well said second participant understands said first participant and wherein each question includes a range of answers and a numeric value that is assigned to any selection that is made within the range of answers, and wherein said absolute value of the difference between the numeric value of each selection provided to each question in the first set of answers and the fourth set of answers is calculated and is used to generate said empathy index for that question, and wherein a low absolute value is indicative of a high level of understanding that said second participant has for the views of said first participant and wherein the second set of answers is compared with the third set of answers to generate a first additional empathy index and wherein said first additional empathy index is indicative of how well said first participant understands said second participant and wherein each question includes a range of answers and a numeric value that is assigned to any selection that is made within the range of answers, and wherein said absolute value of the difference between the selection provided to each question in the second set of answers and the third set of answers is calculated and is used to generate a second additional empathy index for that question, and wherein a low absolute value is indicative of a high level of understanding that said first participant has for the views of said second participant and wherein said first additional empathy index and said second additional empathy index are made available to said first and said second participants as an output of the system.

9. The system of claim 8 including an average of the first additional empathy indices for a grouping of certain of the plurality of questions as a first additional output and including an average of the second additional empathy indices for a grouping of certain of the plurality of questions as a second additional output.

10. The system of claim 8 including an overall average of all of the first additional empathy indices and including an overall average of all of the second additional empathy indices.

11. The system of claim 10 wherein said overall average of all of the first additional empathy indices and said overall average of all of the second additional empathy indices are added and divided by two so as to provide a partnership empathy index; said partnership empathy index being provided to said first participant and to said second participant.

12. The system of claim 3 wherein said operating software is disposed in a server, said server being accessible by an area network.

13. The system of claim 12 wherein the area network includes an Internet.

14. The system of claim 3 wherein said operating software is adapted to detect a potential condition and to provide a warning to either of the participants subsequent to the detection of said potential condition.

15. The system of claim 14 wherein the warning includes an urging for either of the participants to seek professional help regarding a particular answer that was provided by at least one of the participants.

16. The system of claim 3 wherein said operating software is adapted to be disposed in a personal computer.

17. The system of claim 3 wherein access to said software in said data base is provided to said participants subsequent to the payment of a fee.

18. The system of claim 17 wherein said access is provided for a limited period of time.

19. The system of claim 3 wherein said answers are adapted to be changed by said first participant until said first participant elects to finalize their answers and wherein said answers are adapted to be changed by said second participant until said second participant elects to finalize their answers.

20. The system of claim 19 wherein said empathy index is made available to said first participant and to said second participant for a predetermined period of time subsequent to said first participant and said second participant having both finalized their answers.

21. The system of claim 3 further comprising a third party means for referring a customer of a third party to subscribe to said system.

22. The system of claim 21 including means for tracking said third party and wherein subsequent to said customer making a payment to use said system, said third party shall receive a portion of said payment for providing said referral.

* * * * *